(12) United States Patent
Russell et al.

(10) Patent No.: US 7,209,414 B2
(45) Date of Patent: Apr. 24, 2007

(54) SPHERICAL ABERRATION COMPENSATION BY WAVELENGTH

(75) Inventors: Robert G. Russell, Monument, CO (US); Ronald P. Stahl, Monument, CO (US)

(73) Assignee: Plasmon LMS, Inc, Colorado Springs, CO (US)

( * ) Notice: Subject to any disclaimer, the term of this patent is extended or adjusted under 35 U.S.C. 154(b) by 272 days.

(21) Appl. No.: 10/445,492

(22) Filed: May 27, 2003

(65) Prior Publication Data

US 2004/0095873 A1 May 20, 2004

Related U.S. Application Data

(60) Provisional application No. 60/426,722, filed on Nov. 15, 2002.

(51) Int. Cl.
*G11B 7/00* (2006.01)
(52) U.S. Cl. ............... 369/44.23; 369/53.26; 369/53.27
(58) Field of Classification Search ......... 369/44.23, 369/53.26, 112.24
See application file for complete search history.

(56) References Cited

U.S. PATENT DOCUMENTS

| | | | |
|---|---|---|---|
| 3,586,412 A | 6/1971 | Leith | |
| 4,165,917 A | 8/1979 | Yamasita et al. | |
| 4,711,536 A | 12/1987 | Kouchiwa | |
| 5,004,328 A | 4/1991 | Suzuki et al. | |
| 5,044,737 A | 9/1991 | Blankenbecler | |
| 5,293,548 A | 3/1994 | Siebert | |
| 5,519,532 A | 5/1996 | Broome | |
| 5,530,590 A | 6/1996 | Saito | |
| 5,661,597 A | 8/1997 | Sugawara | |
| 5,701,196 A | 12/1997 | Nakamura | |
| 5,760,902 A | 6/1998 | Brody | |
| 5,777,719 A | 7/1998 | Williams et al. | |
| 6,259,512 B1 | 7/2001 | Mizouchi | |
| 6,338,559 B1 | 1/2002 | Williams et al. | |
| 6,350,509 B1 | 2/2002 | Sada et al. | |
| 6,373,807 B1 | 4/2002 | Ohtaki et al. | |
| 6,937,544 B2 * | 8/2005 | Takehara et al. | 369/44.27 |
| 2002/0001071 A1 | 1/2002 | Nomura et al. | |
| 2002/0027707 A1 | 3/2002 | Ono | |
| 2002/0034018 A1 | 3/2002 | Hiraga | |
| 2002/0089760 A1 | 7/2002 | Yamaguchi | |
| 2002/0105617 A1 | 8/2002 | Norrby et al. | |
| 2004/0196766 A1 * | 10/2004 | Tadano | 369/53.23 |

FOREIGN PATENT DOCUMENTS

JP        405019162    *  1/1993

(Continued)

OTHER PUBLICATIONS

English translation of JP 2002-208171.*

*Primary Examiner*—Wayne Young
*Assistant Examiner*—Van T. Pham
(74) *Attorney, Agent, or Firm*—Oppenheimer Wolff & Donnelly LLP

(57) ABSTRACT

A method for minimizing spherical aberration in an optical read/write drive caused by variances in lens thickness and laser wavelength. The method provides an economic solution that pairs objective lenses with laser diodes such that the spherical aberration caused by the objective lens is offset by the spherical aberration caused by the laser wavelength, thereby minimizing or completely canceling the overall spherical aberration.

4 Claims, 4 Drawing Sheets

FOREIGN PATENT DOCUMENTS

| | | |
|---|---|---|
| JP | 6-160721 | 6/1994 |
| JP | 2002-90262 | 3/2002 |
| JP | 2002-208171 | 7/2002 |
| JP | 2002208171 * | 7/2002 |

* cited by examiner

SPHERICAL ABERRATION COMPENSATION BY WAVELENGTH

CROSS REFERENCE TO RELATED APPLICATIONS

This application claims priority from U.S. Provisional Patent Application Ser. No. 60/426,722 filed Nov. 15, 2002.

BACKGROUND OF THE INVENTION

An example of an optical read/write system is shown in FIG. 1. It can be seen that a beam is created and emitted by a laser diode 1. The beam first encounters a beam splitter 3, which splits the beam into multiple beams and reflects these beams toward a collimator 5. The collimator 5 is a type of lens that is constructed and arranged to form a collimated beam. After the split beams pass through the collimator 5, they are parallel with each other and until they pass through an objective lens 7. The objective lens 7 bends the beams so that they all converge at a focal point, which is preferably at the surface or information layer of the media 9. The objective lens 7 may be mounted on a lens actuator that can adjust the distance between the lens and the media, which thereby controls focusing and the radial position of the focused beam.

Once the light has been properly focused on the information layer 9, data marks 10 on the storage media will reflect back less light than the regions between them. The reflected light will then pass back through the objective lens 7, the collimator 5, and the beam splitter 3. Next, the reflected beams pass through a wedge prism 11 that focuses the beams on a photodiode detector 13. The detector 13 measures the signal corresponding to data 10 on the media 9 and may also detect errors in the focusing and positioning of the objective lens 7.

As with any data read/write system, optical systems are vulnerable to flaws and other manufacturing variations, dirt, scratches, and other factors that may result in degraded performance. The effects of some of these factors are easily minimized. For example, some media will include a protective substrate between the information layer and the laser beam. The substrate is generally provided on the outer surface of the storage media. In this case, the beam is still focused on the information layer, thereby reading information through the protective substrate. Focusing the beam at a point beyond the surface of the substrate onto the data marks minimizes the effect that undesirable elements, such as dust particles on the substrate, have on the signal read from the media.

However, other undesirable elements are prevalent and have heretofore gone uncorrected. Two particularly troublesome elements pertain to the thickness of the objective lens and the frequency at which the laser beam operates. Unwanted variations in the thickness and curvature of the objective lens manifest themselves as spherical aberrations in the laser beams passing therethrough. Spherical aberrations cause concentric rings to form around the focused spot on the media, making it difficult to read the stored information. Unwanted variations in the frequency of the laser beams also manifest themselves as spherical aberrations in the beam upon exiting the objective lens, as the lens is constructed and arranged to match the specific frequency of the laser.

Because all manufacturing processes result in components having certain tolerances and variations, spherical aberrations are difficult to avoid using an economical manufacturing process. Moreover, the relatively small radius of the curve used in objective lenses makes spherical aberrations even more difficult to avoid, control and predict. Variations in the wavelength of the laser diode light source are equally as difficult to control and predict using economically feasible manufacturing techniques.

Prior art attempts at accounting for such spherical aberrations have included placing plate glass of varying thickness in a divergent or convergent beam of light in an attempt to minimize the spherical aberration. Another attempt involved slightly de-collimating the beam entering an objective lens to generate spherical aberration of the opposite sign in an attempt to cancel out spherical aberration in the objective lens. Minimal success was met with each.

There is a need for a method of minimizing or eliminating spherical aberration caused by variations in objective lens thickness and laser frequency. Preferably, the method could be used alone or in conjunction with prior art methods.

BRIEF SUMMARY OF THE INVENTION

The present invention minimizes the spherical aberration caused by wavelength error of an objective lens by matching lenses and lasers in such a manner so that, in combination, the errors of each offset each other. Thus, this invention uses the chromatic sensitivity of the objective lens to minimize the spherical aberration present.

Though laser diode wavelengths vary several nanometers from laser to laser, advantageously, the variance will normally remain very consistent over the operating range and lifetime of individual lasers. Likewise, variances in lens thickness and curvature do not vary for an individual lens once produced. Thus, the errors due to each are measurable and constant. Since spherical aberration is a "signed" aberration (it may have a positive or negative value), a positive level of spherical aberration caused by an objective lens may be compensated by pairing the lens with a laser having a nearly equivalent amount of negative spherical aberration caused by the measured actual frequency of a laser.

This invention thus calls for the sorting of objective lenses based on their level of spherical aberration at a nominal laser wavelength, and then matching the objectives with a laser diode that has a wavelength that would introduce a compensating amount of spherical aberration. By following this process a much larger range of variations in objective thicknesses and laser wavelengths can be accepted for use in the build of optical drives.

DETAILED DESCRIPTION OF THE INVENTION

Figure 1:
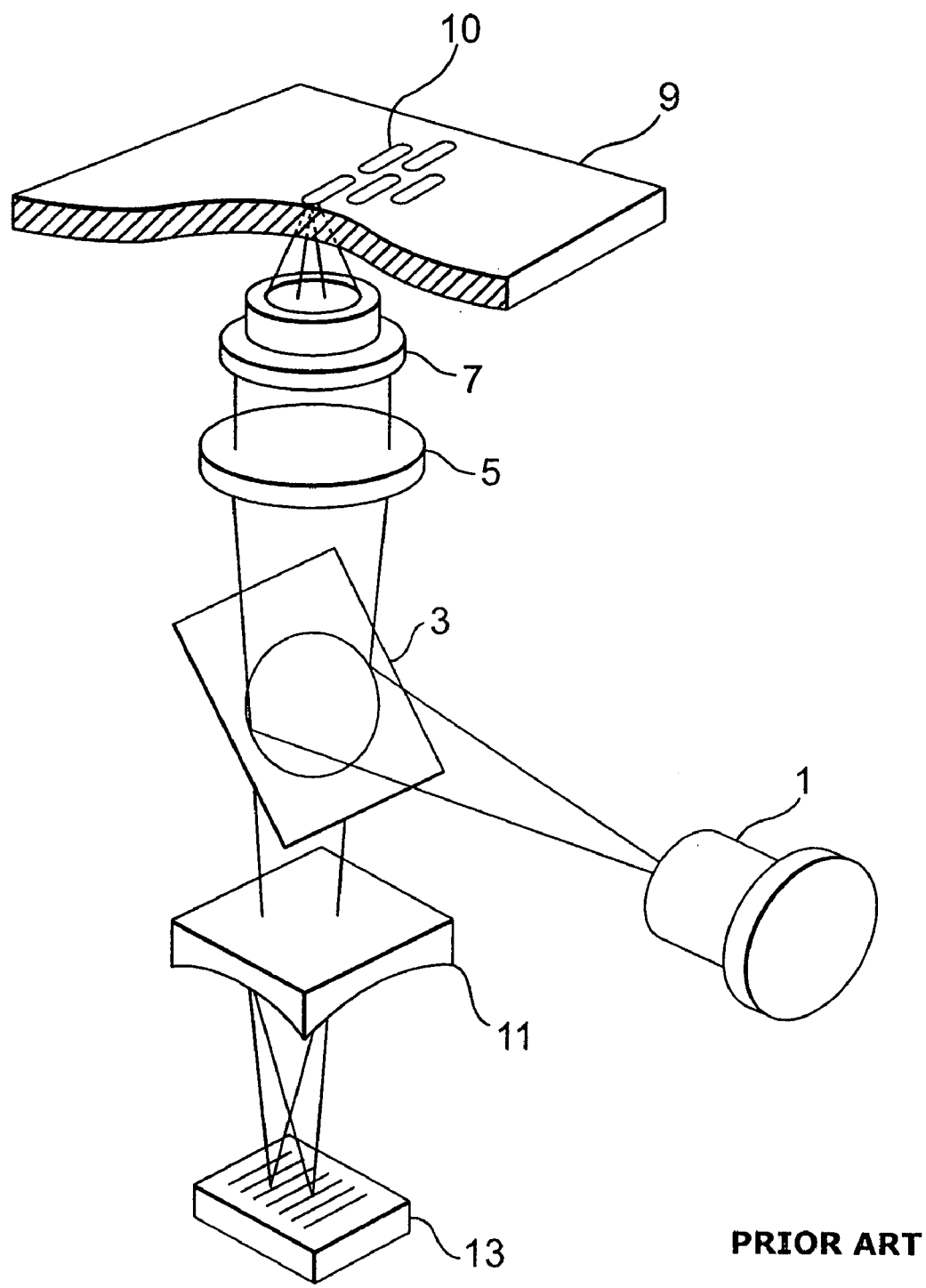
FIG. 1 is a diagram of an optical data read/write system.
Figure 2:
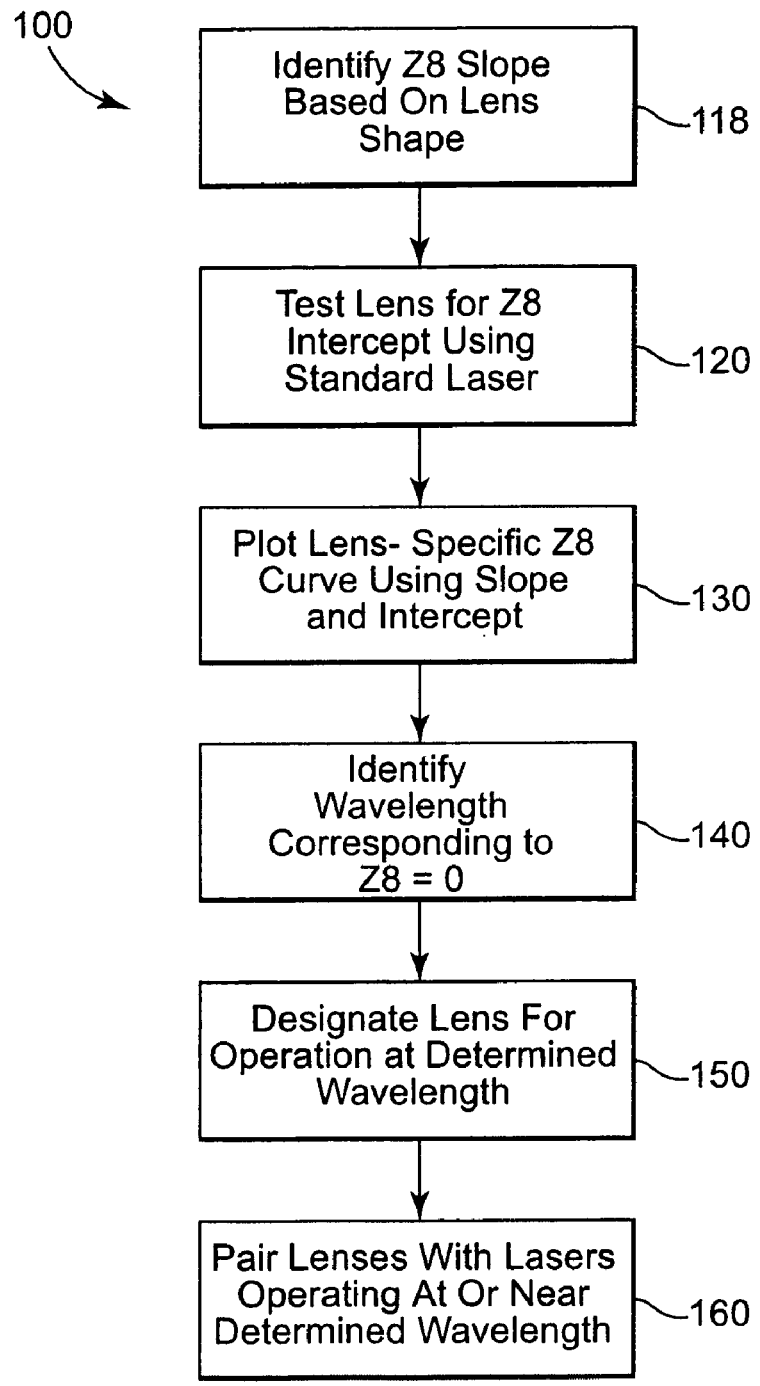
FIG. 2 is a chart outlining the method of the present invention.
Figure 3:
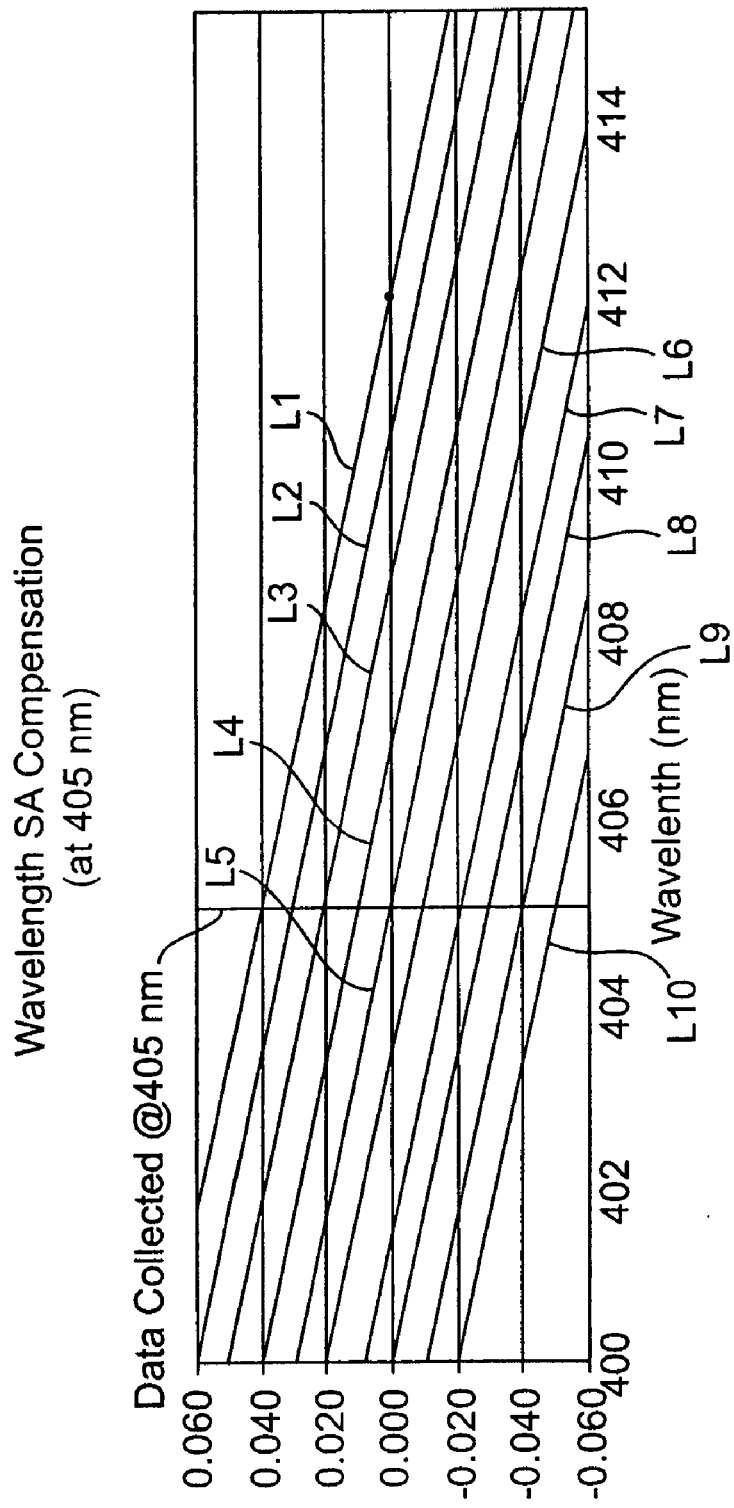
FIG. 3 is chart usable to match various hypothetical lenses with optimal laser frequencies in accordance with the method of the present invention.

Referring now to FIGS. 2 and 3, there is shown a method 100 of the present invention, usable to minimize the spherical aberration effects of two components, namely an objective lens and a laser, of an optical media device due to manufacturing imperfections. It can be seen that the method 100 begins at 110 with identifying a Z8 slope characteristic of the lens shape for the objective lens. The slope of Z8 versus wavelength is very similar for all lenses of the same design, regardless of the slight variations in thickness. FIG. 3 provides an example of a plot of Z8 versus wavelength for ten lenses, L1 through L10, all of the same design but having different thickness variations. It can be seen that all of the plotted lines have the same slope.

At 120, a test is performed on the manufactured objective lens to determine the magnitude of spherical aberration, known as the Z8 term, at a predetermined wavelength for which the lens is designed. This is done using a standard laser having a known wavelength. In the example shown in FIG. 3, a standard laser having a wavelength of 405 nm is used. The Z8 term is recorded for one or more lenses. Notably, the order in which steps 110 and 120 are performed is not important.

At 130, the slope identified at 110, and the intercept value determined at 120, are used to plot the curves of Z8 versus wavelength for one or more objective lenses. The curves are plotted at least until the Z8=0 line is crossed. The intersections of the curves and the Z8=0 line are used at 140 to determine the approximate wavelength that, for a given objective lens, will result in minimal spherical aberration. Once a curve is plotted for an objective lens, and the wavelength corresponding to Z8=0 has been identified, that lens is designated for use at that identified wavelength.

At 160, manufacturing economy is considered when assembling optical read/write systems. Assuming a stockpile of objective lenses have all been identified for use with various wavelengths at 150, and a separate stockpile of laser diodes have been tested and measured for actual operating wavelengths, the lasers are now paired with objective lenses based on wavelength. Manufacturing economy is considered when determining the acceptable difference between an optimal Z8=0 wavelength and the operating wavelength of a laser diode with which the objective lens may be paired.

By way of example, reference is made to FIG. 3. FIG. 3 is a graph showing the results of tests performed on ten lenses, designated L1–L10. The lenses were all designed for use with a laser having a wavelength of 405 nm. Thus, a standard laser, having an actual wavelength of 405 nm was used in order to obtain data on all ten lenses L1–L10. Looking at the vertical line corresponding to 405 nm on the x-axis, it can be seen that none of the lenses performed exactly as designed. In other words, none of the lenses returned a Z8 value of 0.000 when subjected to a 405 nm beam. Lens L5 returned the least spherical aberration at 405 nm, providing a Z8 value of just slightly greater than zero. Lens L1 returned the most positive error, having a Z8 value of 0.040 at 405 nm. Thus, using the known slope to graph a line corresponding to the measured intercept, it can be determined that when used with a laser beam having a wavelength of slightly higher than 412 nm, lens L1 will return a zero Z8 value. In other words, the +7 nm wavelength variance of a 412 nm laser, when passing through lens L1, will produce a counterbalancing −0.040 Z8 value.

Figure 4:
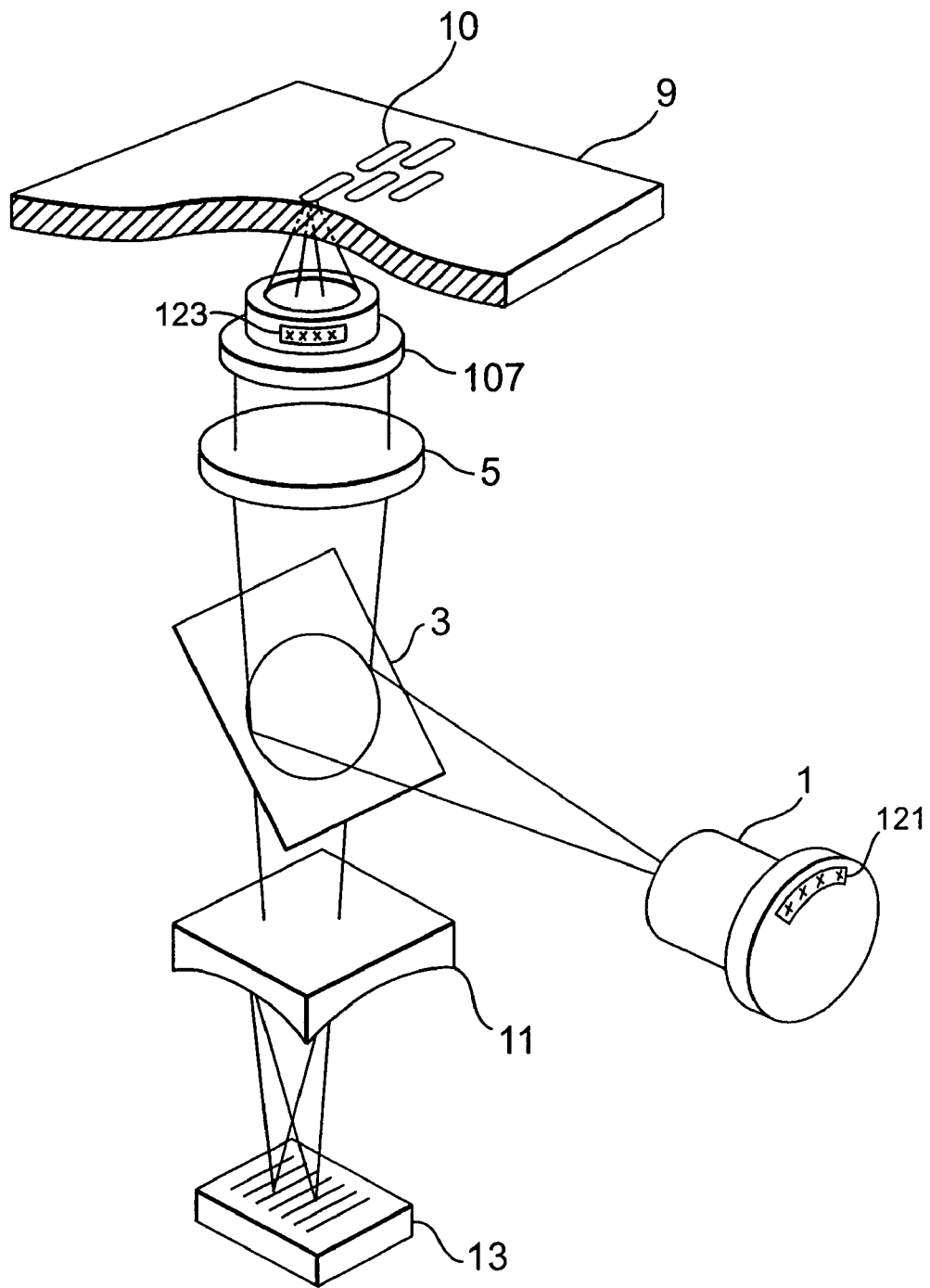
FIG. 4 is a diagram showing an optical data read/write system utilizing matched lenses and lasers according to the present invention.

Referring now to FIG. 4, there is shown an optical read/write system which enjoys the benefits of the method of the present invention. As can be seen, a light beam is created by laser 101. Laser 101 has been previously measured and is identified utilizing label 121 to indicate its measured frequency of operation. The beam created by laser 101 is then projected to beam splitter 3. Beam splitter 3 reflects the generated light signal to collimator 5, which thus produces a collimated beam. Collimator 5 then passes this light signal to matched objective lens 107 which bends the beams to appropriately converge upon a focal point. Again, the desired focal point is located at the surface or information layer of media 9. Matched objective lens 107 includes labeling 123 to identify its operational characteristics. These operational characteristics are measured utilizing the methods and processes outlined above.

A light beam reflected from media 7 are then projected back through matched objective lens 107 and collimator 5 to reach beam splitter 3. In this case, beam splitter 3 allows these light signals to pass through the beam splitter and project to a wedge prism 11. Next, the signal is focused upon a photodiode detector 13. In this manner, the laser and related components can be utilized to detect signals and data structures stored upon the surface of media 9.

Those skilled in the art will further appreciate that the present invention may be embodied in other specific forms without departing from the spirit or central attributes thereof. In that the foregoing description of the present invention discloses only exemplary embodiments thereof, it is to be understood that other variations are contemplated as being within the scope of the present invention. By way of example only, one skilled in the art would appreciate that laser beam frequency is directly related to beam wavelength and could be substituted in all aforementioned and claimed applications of wavelength. Accordingly, the present invention is not limited in the particular embodiments which have been described in detail therein. Rather, reference should be made to the appended claims as indicative of the scope and content of the present invention.

What is claimed is:

1. An optical data read/write system comprising:
   a laser diode capable of emitting a beam having a measured wavelength;
   a beam splitter operably disposed to reflect the beam;
   a collimator operably disposed to allow the beam to pass there through;
   an objective lens operably disposed to focus the beam on a surface containing optical data; and,
   a detector operably disposed to receive portions of the beam reflected off of the surface;
   wherein:
   said objective lens has an actual thickness that differs from a designed thickness, thereby creating spherical aberration of a measurable magnitude and either a positive or negative sign when used with an ideal laser diode emitting a beam having an optimal wavelength;
   said laser diode operates at a measured wavelength which may differ from said optimal wavelength, the laser diode is characterized by creating a spherical aberration of a measurable magnitude and a sign when used with an ideal objective lens having said designed thickness, said magnitude and said sign being caused by the difference between the measured wavelength and the designed wavelength; and,
   said magnitude of the spherical aberration caused by the objective lens approximates the magnitude of the spherical aberration caused by the laser diode;
   said spherical aberration caused by the objective lens and said spherical aberration caused by said laser diode having opposite signs.

2. The system of claim 1 wherein the laser diodes and the objective lenses are selected for inclusion in an optical data read/write drive assembly by the steps comprising:
   selecting the laser diode from a group of laser diodes manufactured to operate at a designed wavelength;

measuring an actual wavelength at which the laser diode operates;

selecting the lens shaped with predictable optical characteristics based upon a previous measurement from a group of measured lenses such that, when a beam of the actual wavelength from the selected laser diode passes through the lens, the resulting aberration matches the aberration of the selected laser diode.

3. The system of claim 2, wherein the step of selecting a lens further comprises:

measuring the lens to determine an optimal beam wavelength that will result in negligible spherical aberration when a beam of said optimal beam wavelength passes through said lens;

using the determined optimal beam wavelength as a criteria for selecting the provided lens.

4. The system of claim 3 wherein selecting a lens from a group of measured objective lenses comprises providing a group of lenses designed to have a single predetermined geometry.

* * * * *